F. HODGKINSON.
LOW PRESSURE TURBINE.
APPLICATION FILED JAN. 2, 1909.
1,189,218.
Patented June 27, 1916.
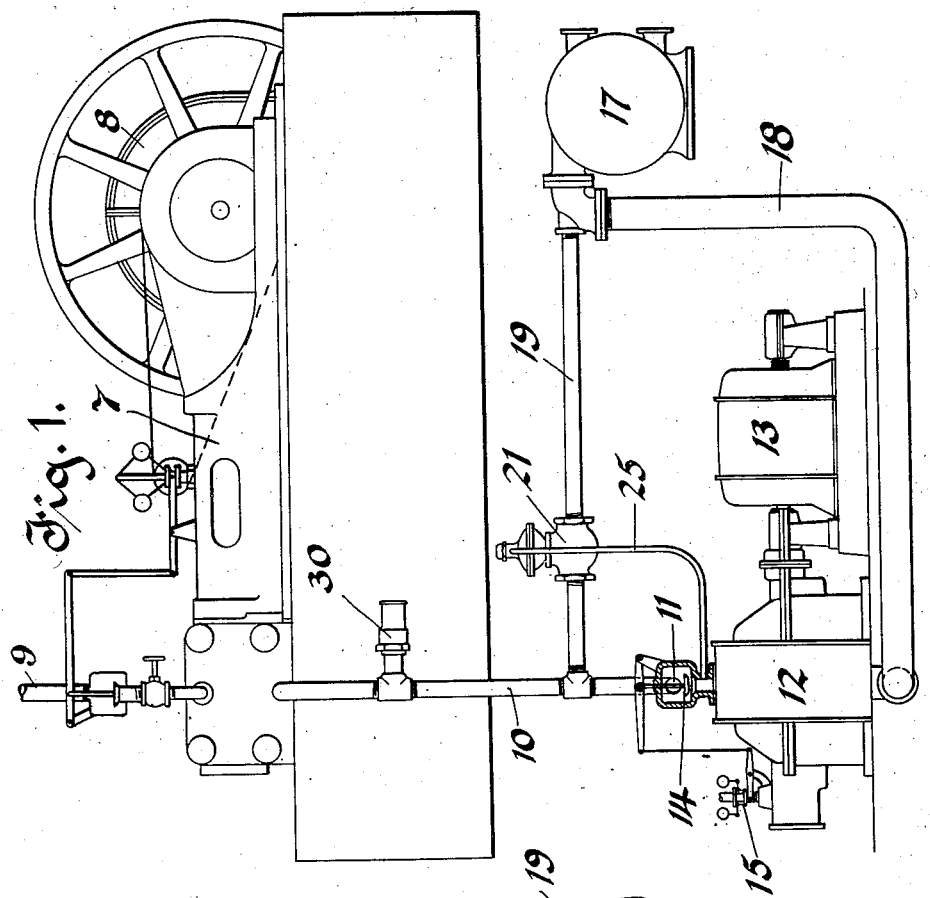
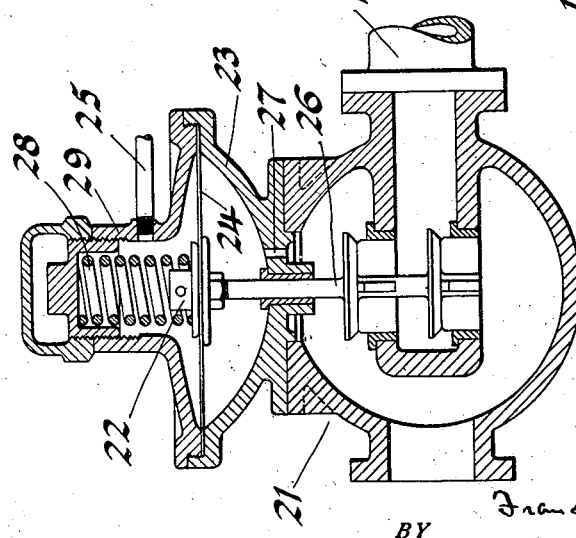
WITNESSES:
INVENTOR.
Francis Hodgkinson
BY
ATTORNEY IN FACT.

UNITED STATES PATENT OFFICE.

FRANCIS HODGKINSON, OF EDGEWOOD PARK, PENNSYLVANIA, ASSIGNOR, BY MESNE ASSIGNMENTS, TO THE COLONIAL TRUST COMPANY, TRUSTEE, OF PITTSBURGH, PENNSYLVANIA, A CORPORATION OF PENNSYLVANIA.

LOW-PRESSURE TURBINE.

1,189,218.     Specification of Letters Patent.     Patented June 27, 1916.

Application filed January 2, 1909. Serial No. 470,458.

*To all whom it may concern:*

Be it known that I, FRANCIS HODGKINSON, a subject of the King of Great Britain and Ireland, and a resident of Edgewood Park, in the county of Allegheny and State of Pennsylvania, have made a new and useful Invention in Low-Pressure Turbines, of which the following is a specification.

This invention relates to means for controlling the disposition of motive fluid in organized apparatus consisting of high and low-pressure engines operating in series on all or a part of the motive fluid supply, but which operate under separate and independently variable loads.

Turbines known as low-pressure turbines are frequently used in conjunction with reciprocating engines where the power from each is used for different purposes and where the load of one is independent of the other. For example, a reciprocating engine might be driving a mill or shafting of any kind and the low-pressure turbine used for driving a dynamo, or the reciprocating engine used for driving a direct current dynamo for one purpose and the low-pressure turbine an alternator for another purpose or vice versa. In such applications it often happens that the load on the low-pressure turbine becomes light while the load on the reciprocating engine remains heavy; in such a case there is an excess of exhaust steam, that is, more than necessary for the low-pressure turbine. In cases like this, it has been customary to allow the excess exhaust steam discharging from the reciprocating engine to pass to the atmosphere by means of an escape valve. With such an arrangement, the reciprocating or high-pressure engine does not obtain the advantages of as complete an expansion of the steam as is available and consequently the efficiency of the organized apparatus drops off rapidly as the load on the low-pressure turbine decreases. This condition is, of course, aggravated when the reciprocating engine is operated under heavy loads and the low-pressure turbine under light or no load.

An object of this invention is to increase the efficiency in operation of such apparatus and to provide means whereby to a great extent the full expansive force of the steam is utilized regardless of the load variations on either the high or low-pressure engine.

In carrying out this invention, I employ in combination with a high-pressure engine, which may be a reciprocating engine or a turbine, a low-pressure engine, which is preferably a turbine, connected in series with a source of supply of steam or other motive fluid and means for automatically by-passing the excess motive fluid around the low-pressure engine to a condenser when the load on the low-pressure engine is such as not to require all of the motive fluid discharged from the high-pressure engine. In other words, I employ means for by-passing steam exhausted from the high-pressure engine around the low-pressure engine when such steam is in excess of that demanded by the low-pressure engine, and I deliver this excess steam directly to the condenser in such manner and quantity as to maintain the pressure in the exhaust of the reciprocating engine at as low a point as is necessary to operate the low-pressure turbine at its load. This arrangement reduces the consumption of motive fluid by the high-pressure engine considerably below what it would be if the excess steam or motive fluid were discharged into the atmosphere or against a fixed back-pressure and it increases the available energy of the organized apparatus.

In the drawings accompanying this application and forming a part thereof: Figure 1 is a more or less diagrammatic arrangement of a high-pressure engine, low-pressure turbine, a condenser and controlling valve arranged to carry out my invention; and, Fig. 2 is a sectional elevation of the controlling valve utilized in the organized apparatus.

Referring to the drawings, a high-pressure reciprocating engine 7, which is illustrated as directly connected to a direct current electric generator 8, receives motive fluid through a steam main 9 and discharges it through piping 10 to the steam inlet 11 of a low-pressure turbine 12, which is illustrated as directly connected to an alternating current generator 13. The delivery of motive fluid to the turbine 12 is controlled by a valve 14, the operation of which is controlled by a speed-responsive governor 15 with which the turbine is provided. The turbine exhausts into a condenser 17 through an exhaust conduit 18.

A pipe 19 connects pipe 10 to the condenser so that the high-pressure engine, at times, may exhaust directly to the condenser 17. An automatically actuated valve 21 is located in the pipe 19 and controls the delivery of motive fluid through it. This valve is more or less directly responsive to load variations on the low-pressure turbine and proportions the direct delivery of exhaust motive fluid from the reciprocating engine to the turbine in accordance with the variations of pressure within the working passages of the turbine.

The valve 21 as illustrated is a balanced puppet valve and is provided with a fluid-actuated mechanism 22 for controlling its operation. The mechanism 22 consists of a casing 23 which supports a flexible diaphragm 24 and to which, above the diaphragm, fluid pressure is admitted through a pipe 25. The diaphragm is operatively connected to the valve stem 26 of the valve 21 and is exposed on one side to the steam pressure passing through the pipe 10. This pressure is admitted to the diaphragm through the restricted orifice 27. The pipe 25 enters the turbine casing at such a point that the upper face of the diaphragm 24 is exposed to the steam pressure delivered by the governor controlled valve 14 of the turbine. With such an arrangement, the diaphragm is operated by the difference of pressure between the pressure existing in the pipe 10 and the initial pressure in the working stage of the turbine. An adjustable spring 28 is provided in the casing 29 and arranged to operate in conjunction with the fluid pressure above the diaphragm. The valve is so adjusted as to open and deliver a greater amount of steam from the reciprocating engine around the turbine directly to the condenser as the pressure falls at the inlet end of the turbine. The effect of this adjustment will be to consistently maintain a pressure in the exhaust pipe 10 of the reciprocating engine which is but little higher than that required by the turbine to carry its load. This will increase the expansion ratio of the reciprocating engine and improve its economy over what it would be if the excess steam were exhausted into the atmosphere or against a fixed back-pressure.

As the load on the turbine 12 increases the governor actuated valve 14 will open more and more and consequently cause an increase of fluid pressure at the inlet end of the turbine. This pressure will be transmitted to the diaphragm 24 through the piping 25 and will operate the valve 26 to decrease the flow of steam through piping 19 to the condenser. Under some conditions of load the valve 21 may be entirely closed and the flow of steam through pipe 19 stopped. As the load on the turbine decreases the valve 14 throttles the supply of steam to the turbine and consequently decreases the pressure at the inlet end of the turbine. This decrease in pressure reacts on the diaphragm 24 to open the valve 21 and to increase the flow of steam through the pipe 19 to the condenser.

Variations in load on the reciprocating engine, which, of course, is governor controlled, will cause variations in the exhaust pressure of the engine. The valve 21 is also responsive to these pressures and will open or close to maintain a supply of steam to the turbine adequate to the load demand of the turbine. I have indicated at 30 a relief valve for discharging the exhaust steam of the engine 7 into the atmosphere. This is provided to take care of emergency conditions. Valve 21 may be operated by a piston, if desired, instead of by a diaphragm, or the valve may be manually controlled and be entirely independent of the turbine governor and may operate independently of the speed of the turbine.

It will be understood that this invention is not necessarily limited to organized apparatus or systems employing a condenser. The condenser may be dispensed with if desired and pipe 19 led to any point where the pressure is substantially the same as the exhaust pressure of the turbine. It may also be desirable to utilize this invention, for instance, in a plant where two kinds of power are required; that is, where one engine is utilized for the direct driving of machinery and the other for the driving of a generator. In this same plant steam of relatively high pressure might be required for some industrial purpose at, say, fifty pounds pressure and, furthermore, steam at 212° might be required for some other purpose. In a case such as this, it would be desirable to employ a high-pressure engine or turbine expanding from the relatively high boiler pressure to, say, the pressure of fifty pounds and then employ a low-pressure engine or turbine expanding the steam from the pressure of fifty pounds to atmospheric pressure. The exhaust pipe from the low-pressure engine or turbine could then discharge into the heaters or other apparatus utilizing the steam at 212°. Of course, it will be understood that the supply of exhaust motive fluid may be derived from a number of sources and not necessarily from one engine of higher pressure.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. In combination with an exhaust steam supply, a turbine designed to operate on steam from said supply, a condenser connected to said supply and means responsive to the speed variations in said turbine for automatically shunting all or a portion of the steam from said supply through said turbine.

2. In combination with an exhaust steam supply, a turbine designed to operate on steam from said supply, a condenser connected to the exhaust from said turbine, a connection between said condenser and said supply and means responsive to the speed variations of said turbine for automatically shunting all or a portion of the steam from said supply around said turbine.

3. In combination with an exhaust steam supply, a turbine designed to operate on steam from said supply, a condenser connected to said supply and said turbine and means responsive to the variations in pressure at the inlet of said turbine for automatically controlling the passage of steam to said condenser.

4. In combination with an engine, a second engine designed to operate on the fluid exhausted from said first engine, a condenser, connections between said condenser and both of said engines and means responsive to speed variations in said second engine for automatically controlling the passage of fluid to said condenser.

5. In combination with an engine, a second engine designed to operate on the fluid exhausted from said first engine, a condenser, connections between said condenser and both of said engines and means responsive to speed variations in said second engine for automatically shunting all or a portion of the exhaust fluid through said second engine.

6. In combination with an engine, a second engine designed to operate on the fluid exhausted from said first engine, a condenser, connections between said condenser and both of said engines and means for automatically shunting all or a portion of the exhaust fluid around said second engine.

7. In combination with an exhaust steam supply, a turbine designed to operate on steam from said supply, an inlet valve for said turbine, an agent responsive to speed variations of said turbine, connections between said agent and said valve, a condenser connected to said turbine and to said supply and a device located in the connection between said condenser and said supply and responsive to pressure variations between said valve and said turbine for automatically controlling the effective area of the connection between said supply and said condenser.

8. In combination, a high-pressure reciprocating engine, a low-pressure turbine connected to the exhaust of said engine, a relief passage connected to the exhaust of said high-pressure turbine and valve mechanism for automatically controlling the effective area of said relief passage to thereby govern the turbine in accordance with the load conditions.

9. In combination with an exhaust steam supply, a turbine designed to operate on steam from said supply, piping for leading steam from said supply around said turbine, an inlet valve for said turbine, a governor controlling said inlet valve and a valve in the piping leading around said turbine.

10. In combination with an exhaust steam supply, a turbine designed to operate on steam from said supply, a condenser connected to the exhaust of said turbine, a connection between said condenser and said supply, an admission valve for said turbine, a speed-responsive agent controlling the operation of said admission valve and a valve in the connection between said condenser and said supply.

11. In combination with an exhaust steam supply, a turbine designed to operate on steam from said supply and to exhaust to a lower pressure, a connection for leading steam from said supply to a point where the pressure is substantially the same as the exhaust pressure of said turbine and means responsive to the speed variations of said turbine for automatically shunting all or a portion of the steam from said supply around said turbine.

12. In combination, a high pressure engine, a low pressure turbine having its inlet connected to the exhaust of said engine, a by-pass leading from the exhaust of said high pressure engine to the exhaust of said turbine, and automatic mechanism for controlling the effective area of said by-pass in accordance with the load on said turbine.

13. In combination with an exhaust steam supply, an engine designed to operate on steam from said supply, a speed-responsive agent connected to said engine and means controlled by said agent for shunting all or a portion of the steam from said supply around said engine.

14. In combination with an engine adapted to operate on relatively high pressure motive fluid, a turbine designed to operate on motive fluid exhausted from said engine, a condenser connected to said engine, a valve in the line between said engine and said condenser and a governor on said turbine controlling the operation of said valve.

15. In combination with a reciprocating steam engine, a turbine designed to operate on exhaust steam from said engine, a condenser connected to the exhaust of said engine, a connection from the line between them to said turbine, a connection between said turbine and said condenser and means responsive to speed variations in said turbine for rendering the connection to said turbine effective.

16. In combination with a reciprocating steam engine, a turbine designed to operate on exhaust steam from said engine, a condenser connected to the exhaust of said engine, a connection from the line between them to said turbine, a connection between said turbine and said condenser and means for shunting all or a portion of the exhaust from said engine through said connection to said turbine.

17. In combination with a reciprocating steam engine, a turbine designed to operate on exhaust steam from said engine, a valved connection between the exhaust of said engine and said turbine, a condenser and connections between said engine and said condenser and said turbine and said condenser, a valve in the connection between said engine and said condenser and a speed-responsive agent connected to said turbine whereby said valve is controlled.

18. In combination, a high pressure reciprocating engine, a low pressure turbine, a connection between the exhaust of the high pressure engine and the turbine, a relief passage connecting with said connection, a speed-responsive agent operatively connected to the turbine and a valve under the control of said speed-responsive agent for controlling the effective area of said relief passage.

19. In combination with an exhaust steam supply, a turbine designed to operate on steam from said supply, a line leading steam from said supply around said turbine, a valve between said supply and said turbine, a valve in the line leading around said turbine and a turbine speed-responsive agent controlling the operation of said latter valve.

20. In combination with an exhaust steam supply, a turbine designed to operate on steam from said supply, a condenser connected to the exhaust of said turbine, a connection between said condenser and said supply, a valve between said turbine and said supply, a valve in the connection between said condenser and said supply and a speed-responsive agent for controlling the operation of said latter valve.

21. In a power system, the combination of an engine, an exhaust pipe extending therefrom divided into two paths, a condenser in direct communication with said exhaust pipe by one of said paths, a turbine in communication with said exhaust pipe by the other of said paths, valves for limiting the flow through said paths, and a governor controlling said valves.

22. In a power system, the combination of an engine, an exhaust therefor, a turbine in communication with said exhaust, a valve in the turbine inlet, a valve in said exhaust beyond the point of said communication, a governor controlling both said valves, and a condenser connected to the exhausts of said engine and turbine.

23. In combination with a turbine, a passage for delivering motive fluid to the inlet port of the turbine, a valve located in a by-pass communicating with said passage and with the turbine exhaust, means responsive to the speed of the turbine and to the pressure of the fluid in said passage for controlling the operation of said valve.

24. In combination with a turbine, a fluid admission passage communicating with the inlet thereof, and a by-pass communicating with said passage and with the region of exhaust of said turbine, a valve controlling the passage of fluid through said by-pass, means actuated by the pressure of the fluid in said admission passage and controlled by a speed responsive governor for actuating said valve, and a speed responsive governor driven by said turbine.

25. In a power system, a high pressure engine to which high pressure motive fluid is delivered, a low pressure engine, a passage between the exhaust of said high pressure engine and the inlet of said low pressure engine, a by-pass communicating with said passage and with the region of exhaust of said low pressure engine, a governor for said low pressure engine, and means responsive to the pressure in said passage and controlled by said governor for controlling the delivery of fluid through said by-pass.

26. In a power system, a high pressure engine to which high pressure motive fluid is delivered, a low pressure engine adapted to operate on low pressure fluid, a passage connecting the exhaust of the high pressure and the inlet of the low pressure engine, a by-pass around the low pressure engine communicating with the said passage and with the region of exhaust of said low pressure engine, a valve in said by-pass for controlling the delivery of fluid therethrough, and pressure responsive means for controlling the operation of said valve.

27. In a power system, a high pressure engine, a low pressure engine adapted to receive motive fluid exhausted from the high pressure engine, a passage communicating with the exhaust of the high pressure engine and the inlet of the low pressure engine, a by-pass communicating with said passage and the region of exhaust of said low pressure engine, and means responsive to the pressure of the fluid within said passage for controlling the flow of fluid through said by-pass.

28. In a power system, a high pressure engine, a low pressure engine adapted to receive motive fluid exhausted from the high pressure engine, a passage placing the exhaust of said high pressure engine in communication with an inlet port of said low pressure engine, a by-pass communicating with said passage and with the region of exhaust of said low pressure engine, a valve for controlling the delivery of fluid through said by-pass, an inlet valve for controlling the delivery of fluid from said passage to said low pressure engine, a governor for controlling the operation of said inlet valve, pressure actuated means for actuating the valve in said by-pass and responsive in operation to variations in the difference in pressure of the fluid on opposite sides of said inlet valve.

29. In a power system, a high pressure engine, a low pressure engine adapted to receive motive fluid exhausted from said high pressure engine, a passage connecting the exhaust of said high pressure engine with an inlet port of said low pressure engine, a by-pass communicating with said passage and with the region of exhaust of said low pressure engine, for by-passing fluid exhausted from the high pressure engine around said low pressure engine, a valve located within the by-pass for controlling the delivery of motive fluid therethrough, means responsive to the pressure within said passage for actuating said valve, and a governor controlled valve for controlling the operation of said means.

30. In a power system, a high pressure engine, a low pressure engine adapted to receive motive fluid exhausted from said high pressure engine, a passage communicating with the exhaust of the high pressure engine and an inlet port of the low pressure engine, a by-pass communicating with said passage and with a region of pressure lower than that normally existing at the inlet of said low pressure engine, a valve for controlling the flow of fluid through said by-pass, and load responsive means for controlling the operation of said valve.

31. In a power system, a high pressure engine, a low pressure engine adapted to receive motive fluid exhausted from said high pressure engine, a passage communicating with the exhaust of the high pressure engine and an inlet port of the low pressure engine, a by-pass communicating with said passage and with a region of pressure lower than that normally existing at the inlet of said low pressure engine, a valve for controlling the flow of fluid through said by-pass, and a governor responsive to variations in speed of the low pressure engine for controlling the operation of said valve.

32. In a power system, a high pressure engine, a low pressure engine adapted to receive motive fluid exhausted from said high pressure engine, a passage communicating with the exhaust of the high pressure engine and an inlet port of the low pressure engine, a by-pass communicating with said passage and with a region of pressure lower than that normally existing at the inlet of said low pressure engine, a valve for controlling the flow of fluid through said by-pass and means responsive to variations in the pressure of the fluid in said passage for controlling the operation of said valve.

33. In a power system, a high pressure engine, a low pressure engine, a passage for delivering fluid exhausted from the high pressure engine to an inlet port of said low pressure engine, a by-pass communicating with said passage and with a fluid passage of the low pressure engine in which the pressure is normally lower than the pressure existing at said inlet port, and a load responsive valve for controlling the delivering of fluid through said by-pass.

34. In combination, independent engines working at different pressures and through which the motive fluid passes in series relation in performing work, and a regulator for one engine which varies the pressure difference to which the preceding engine is subjected.

35. In combination, independent engines working at different pressures and through which the motive fluid passes in series relation in performing useful work, a regulator for one engine which varies the pressure difference to which the preceding engine is subjected, and a governing mechanism for regulating the speed of the last mentioned engine.

36. In combination, independent engines working at different pressures and through which the motive fluid passes in series relation in performing useful work, a governor for one engine which controls the exhaust pressure of the preceding engine, and a governor for said latter engine which controls the admission of fluid thereto.

37. In combination, a high pressure engine, a low pressure engine receiving motive fluid exhausted from the high pressure engine, and a governing mechanism for the low pressure engine for varying the pressure difference on which the high pressure engine operates.

38. In combination, an engine, a turbine receiving motive fluid exhausted from the engine, a condenser and a governor mechanism for the turbine for controlling communication between said engine and said condenser.

39. In combination, independent engines through which the motive fluid normally passes in series relation, a condenser, and means responsive to variations in the speed of the second engine of the series for controlling direct communication between the first engine of the series and the condenser.

40. In combination, a high pressure engine, a low pressure engine receiving motive fluid therefrom, a condenser, and means responsive to variations in load on the low pressure engine for controlling direct communication between the high pressure engine and the condenser independently of the load on the high pressure engine.

41. In combination, an engine, a second engine adapted to receive motive fluid exhausted from the first engine, and means responsive to the pressure of the fluid delivered from the first engine, and to the variations in speed of the second engine for varying the pressure range under which the first engine operates.

42. In combination, an engine, a second engine adapted to receive motive fluid exhausted from the first engine, and a regulator for varying the pressure difference on which the first engine operates, comprising means responsive to variations in speed of the second engine and variations in the pressure of the fluid discharged from the first engine.

43. In combination, an engine, means for supplying it with steam, a second engine, means connecting the two engines, so that the second is operated by exhaust steam from the first, a passage communicating with a low pressure region in which the pressure is lower than the pressure normally existing at the inlet of the second engine, valve means for controlling the delivery of fluid through said passage and a device responsive to the speed of the second engine for controlling the operation of said valve means.

44. In a power system, the combination of an engine, an exhaust pipe extending therefrom divided into two paths, a turbine in communication with said exhaust pipe by one of said paths, valves for limiting the flow through said paths, and a governor controlling said valves.

45. In combination, an engine to which high pressure fluid is adapted to be delivered, a second engine, a passage between the exhaust of the first and the inlet port of the second engine, a condenser, valve means for placing said passage in communication with said condenser, a pressure actuated diaphragm for controlling the operation of said valve means, subjected on one side to the pressure in said passage and on the other side to the pressure existing at the inlet port of said second engine, and a governor controlled valve for controlling the delivery of fluid from said passage through said inlet port.

46. In combination, a high pressure engine, a low pressure turbine, a passage for placing the exhaust of the engine in communication with an inlet port of the turbine, an inlet valve for controlling the delivery of fluid through the inlet port of the turbine, a governor responsive to variations in the speed of the turbine for controlling the operation of the inlet valve, a condenser, valve means for controlling direct communication between said condenser and said passage, and a device responsive to the difference in pressure existing in said passage and at the inlet port of the turbine for controlling the operation of the valve means.

47. In combination, an engine, a second engine adapted to receive motive fluid from the first engine, a passage communicating with the exhaust of the first and an inlet port of the second engine, a condenser, valve means for controlling direct communication between the first engine and the condenser, pressure responsive means for controlling the operation of said valve means, and a governor controlled relay valve, responsive in operation to variations in the speed of the second engine for controlling the operation of said device.

48. In a power generating system, the combination with an engine, of regulating means therefor, comprising a valve regulating the passage of steam to the engine, means responsive to the speed of the engine for adjusting said valve and means responsive to the difference in pressure at the opposite sides of said valve due to its throttling action for modifying the action of said regulating means.

49. A power generating system comprising in combination, an engine, a valve regulating the passage of steam to the engine, means responsive to the speed of the engine for adjusting said valve and means responsive to the difference in pressures at the opposite sides of said valve due to its throttling action for modifying the speed regulating effect of said valve.

50. A power generating system comprising in combination, an engine, a throttle valve controlling the passage of steam to the engine, means responsive to the speed of the engine for adjusting said throttle valve and means responsive to the difference in pressures at the opposite sides of said valve due to its throttling action for modifying the pressure of the steam entering said valve.

51. A power generating system comprising in combination, two engines receiving steam in series, a valve controlling the passage of steam from one engine to the other, means responsive to the speed of the engine receiving steam through said valve for adjusting the latter, a by-pass about said second engine for steam passing through the first engine, a valve controlling said by-pass and means for adjusting said valve in response to the differences in pressure at the opposite sides of the first mentioned valve due to the throttling action of the latter.

52. In combination, a source of low pressure steam, an engine receiving steam from said source, condensing apparatus into which said engine exhausts, a by-pass about said engine connecting said source to said condensing apparatus, a valve regulating the passage of steam from said source to said engine, a speed governor controlling said valve, a second valve regulating the flow of steam through said by-pass, and operating means therefor responsive to the difference in the pressures at the opposite sides of the first mentioned valve for opening and closing said second valve as said pressure difference increases and decreases.

53. In a power generating system, the combination with an engine and a steam supply conduit connected thereto, of regulating means comprising a valve regulating the passage of steam to the engine through said conduit, means responsive to speed of the engine for adjusting said valve, means responsive to the differences in pressure at the opposite sides of said valve due to its throttling action for modifying the action of said regulating means, and a pressure relief valve connected to said conduit on the supply side of said throttle valve.

In testimony whereof, I have hereunto subscribed my name this 31st day of December, 1908.

FRANCIS HODGKINSON.

Witnesses:
C. W. McGhee,
Geo. A. Walker.